April 13, 1971     F. T. EGGERTSEN     3,574,549

MICROANALYZER THERMAL STUDIES

Filed Feb. 20, 1967     3 Sheets-Sheet 1

INVENTOR:
F. T. EGGERTSEN

INVENTOR:
F. T. EGGERTSEN

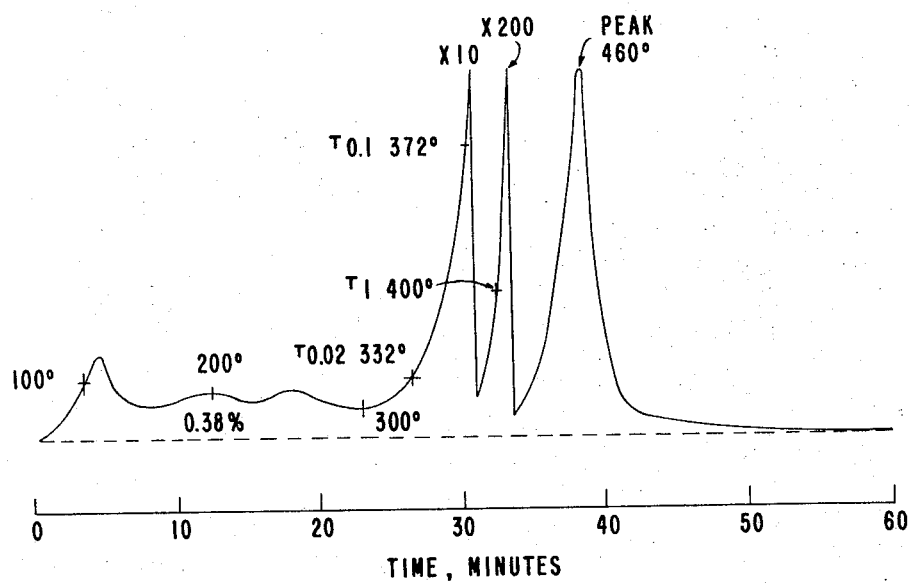
FIG. 5
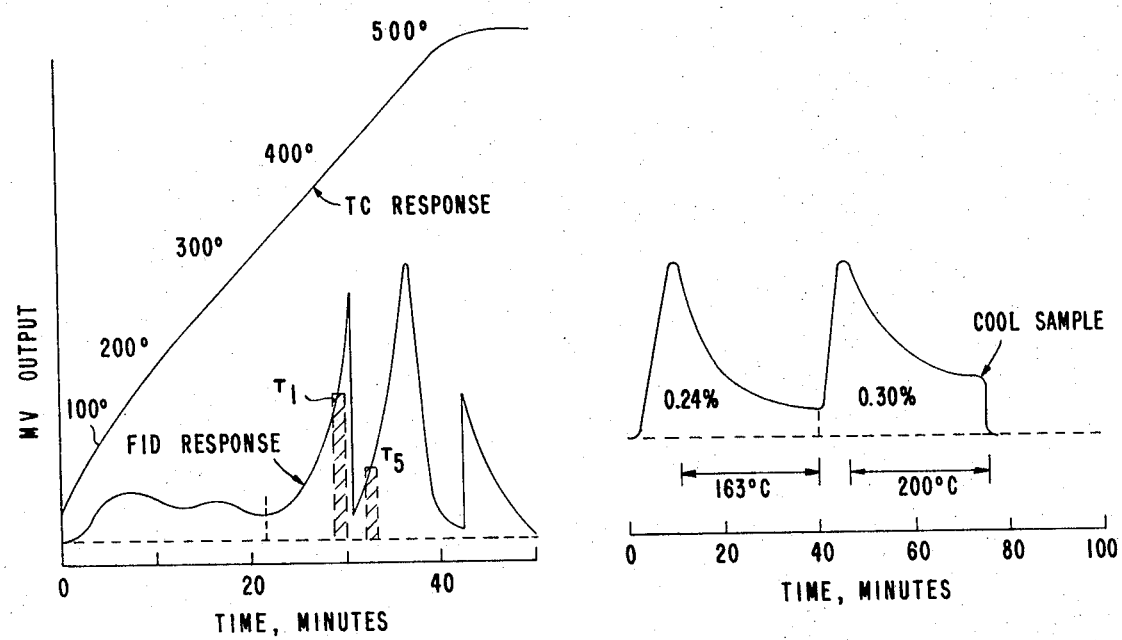
FIG. 6
FIG. 7
INVENTOR:
F. T. EGGERTSEN

United States Patent Office 3,574,549
Patented Apr. 13, 1971

3,574,549
MICROANALYZER FOR THERMAL STUDIES
Frank T. Eggertsen, Orinda, Calif., assignor to Shell Oil
Company, New York, N.Y.
Filed Feb. 20, 1967, Ser. No. 617,337
Int. Cl. G01n 25/20, 25/24
U.S. Cl. 23—230                                    9 Claims

ABSTRACT OF THE DISCLOSURE

A highly sensitive microanalyzer for determining the thermal stability, vapor pressure, volatile content of samples, and the hydrocarbon yield versus temperature pattern of oil shales and other organic-bearing samples. The instrument consists of a pyrolyzer combined directly with a sensitive detector operated at a high temperature.

In many chemical analyses it is often desirable to determine thermal stability of a sample as well as the percentage of volatiles contained in the sample. For example, in analysis of various oil shales and bitumens it is desirable to determine as a function of temperature the amount of volatile hydrocarbon contained in the samples. In the chemical industry it is necessary at times to know the thermal stability of various products, for example polymers. In addition to knowing the thermal stability of the polymer, it is required at times that the amount of volatiles contained in the polymer be determined to enable correction of the manufacturing process to hold the percent of volatiles within the acceptable limits.

In the past, numerous methods and techniques have been suggested for measuring the percentage of volatiles in a sample and determining the thermal stability of the sample. For example, thermogravimetric analysis has been proposed for determining weight losses as a function of temperature. In this method the sample is heated to drive off the volatiles and the sample is continually weighed on a thermobalance. A second method is a gas evolution analysis in which the volatile products are flashed into an evacuated system and their quantity determined by pressure measurements with a suitable gauge. A third method that has been proposed consists of heating the sample to drive off the volatiles and using a carrier gas to transport the volatiles to a combustion furnace where they are oxidized over copper oxide to simple gases. The gases are then detected by means of a themal-conductivity detector.

While all of the above methods will produce acceptable results under ideal conditions, they do have several disadvantages. For example, thermogravimetric measurements require expensive equipment and a considerable time to obtain a complete analysis. Also, the system requires a rather large sample to achieve an acceptable accuracy since the sample must be continuously weighed as the volatiles are driven off.

The second method is of only limited application because partial condensation of pyrolysis products occurs in most cases making gas pressure measurements an unreliable measure of yield.

The method in which the volatile products are converted to gases in a combustion furnace and measured by a thermal conductivity detector yields results that are difficult to interpret quantitatively in many cases, and greater sensitivity and specificity would be desirable. It will be evident from the description below that the apparatus of the present invention is superior in that it provides a quantitative measurement of hydrocarbons, and greater sensitivity is possible than with thermal conductivity detection.

The present invention solves the above problems by providing a relatively simple thermal analysis unit, employing a highly sensitive specific detector, by means of which quantitative measurements can be made of volatiles and/or thermal decomposition products. A small sample, e.g., 1 to 10 mg. is heated by temperature programming or in isothermal steps and the products are swept by means of a suitable carrier gas to the detector. The sample temperature is recorded on one channel of a dual-channel recorder while the signal from the detector is recorded on the remaining channel.

In a preferred version of the apparatus a hydrogen flame-ionization detector is used and said detector is operated at a high temperature, e.g. 400–500° C., and is combined with the pyrolyzer in a single unit. Close coupling of the pyrolyzer to the high-temperature detector virtually eliminates any problem from condensation of high mole weight pyrolysis products.

The above advantages and other features of this invention will be more easily understood from the following detailed description of preferred embodiments when taken in conjunction with the attached drawings in which:

FIGS. 5, 6 and 7 show thermal analysis curves for samples of an ethylene polymer, an oil shale, and a bitumen obtained using the apparatus shown in FIG. 2.

Figure 1:
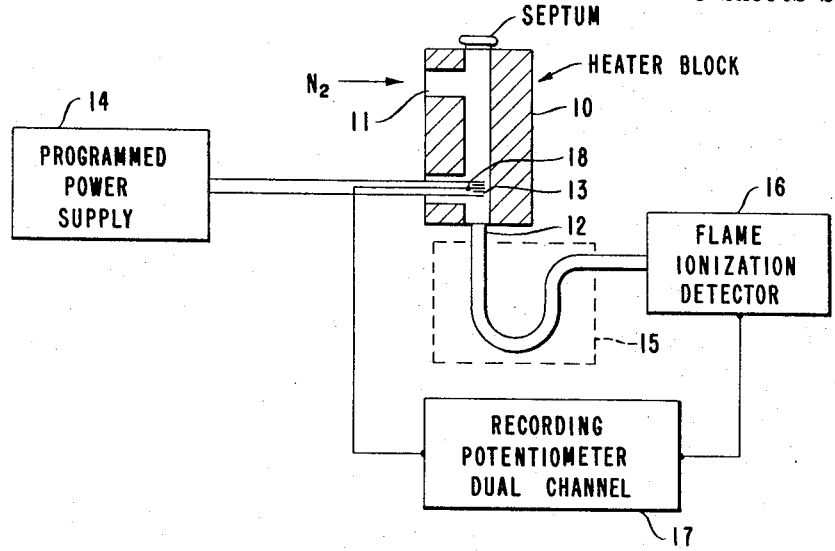
FIG. 1 is a block diagram of one embodiment of the microanalyzer of this invention.

Referring now to FIG. 1 there is shown a pyrolysis detector constructed in accordance with this invention. More particularly there is shown a heating or pyrolysis unit 10 having an inlet opening 11 and an outlet opening 12. The pyrolysis unit may also include heating elements (not shown in FIG. 1) for heating samples placed on the pyrolysis element 13. A carrier gas, usually nitrogen, is admitted through the opening 11 and the carrier gas plus the volatiles liberated from the sample are discharged through the opening 12. The outlet opening 12 is connected to a short length of tubing to transport vapors to the detector 16. The detector may, for example, be a flame-ionization detector when hydrocarbons are to be detected. The tubing may conveniently be stainless steel tubing packed with glass wool. The pyrolysis unit and connecting line to the detector are maintained at an elevated temperature, for example 200° C., to minimize condensation of vaporized products. The pyrolysis sample holder may be a filament coil 13 positioned in the pyrolysis unit 10. As shown in the drawing the filament coil is formed in the shape of a cone from suitable wire, for example a two-inch length of platinum wire may be wound in the shape of a cone of about 3 mm. deep by 3 mm. in diameter at the opening. The capacity of this size pyrolyzing filament coil will be from 1 to 2 milligrams of sample. The filament coil may be glass coated to form a cup and thus prevent loss of liquid or powder samples; the glass also makes the temperature of the coil more uniform. The filament coil 13 is coupled to a programmed power supply 14 that is designed to increase the voltage to the filament 13 at a rate to provide a heating rate of 2–20° C. per minute.

The temperature of the filament coil is measured by means of a thermocouple 18, which is attached directly to the filament coil. For example, a Pt/Pt—Rh thermocouple may be used with a Pt filament. The thermocouple 18 is connected to a suitable measuring circuit whose output is recorded on a chart recorder 17. As shown, the chart recorder 17 may be a conventional dual-channel recording potentiometer the temperature of the filament coil being recorded on one channel and the detector signal on the other channel. The flame detector signal may be monitored also by a suitable integrator as used in gas chromatography.

The volatiles and other materials liberated in the pyrolysis unit are swept by the carrier gas into the flame-ionization detector 16, which is maintained at a high temperature to minimize condensation of pyrolysis products. The flame-ionization detector 16 is a well-known device and is normally used with gas-liquid chromatograph units. For example, the flame-ionization detector manufactured by the Aerograph Division of Varian Associates may be used.

The grst step in operating the above unit is to establish a steady baseline by purging the system for 10–20 minutes while maintaining the temperature of the pyrolysis unit, the connecting tubing and the flame the temperature of the pryolysis unit, the connecting tubing and the same detector at a high level as determined by the temperature limitations of the apparatus, e.g. 200–300° C. After purging the system the pyrolyzer unit is cooled to the desired starting temperature and the sample is placed in the pyrolysis coil (previously cleaned by heating it to red heat in air). Alternatively, the sample is placed in a small container that fits inside the coil. This permits accurate weighing of the sample and residue. The coil with the sample in place is inserted in the pyrolysis unit, the flame detector lighted and the baseline re-established. As explained above, the power supply to the pyrolysis coil provides the desired heating schedule.

The signals from the thermocouple 8 and the flame-ionization detector 16 are then detected and recorded in a correlatable manner on the dual-channel recorder 17. The process is continued until thermal degradation of the sample is essentially complete as noted on the recorder chart 17. Trace volatiles are indicated generally by peaks in the thermogram, whereas thermal decomposition is evidenced by a relatively continuous increase in detector signal as the temperature is increased.

The above-described microthermal analsyis (MTA) provides a sensitive and reliable measure of thermal decomposition rates and trace volatiles. The data obtained are analogous to those obtained by conventional thermogravimetric analysis (TGA), but the new thermal analyzer has several advantages. The highly sensitive detector makes it applicable for measuring much lower decomposition rates—down to 0.001% per minute for a 1–2 mg. sample of polymer. These low rates are indicated immediately, whereas in TGA analysis long heating times are required to observe weight loses corresponding to such low decomposition rates. Compared with TGA, much smaller samples are required which allows faster temperature equilibration. The filament coil pyrolyzer has a low thermal mass and thus allows convenient and rapid adjustment of temperature over a wide temperature range (at least to 900° C.). This is of particular advantage for isothermal decomposition studies.

Figure 3:
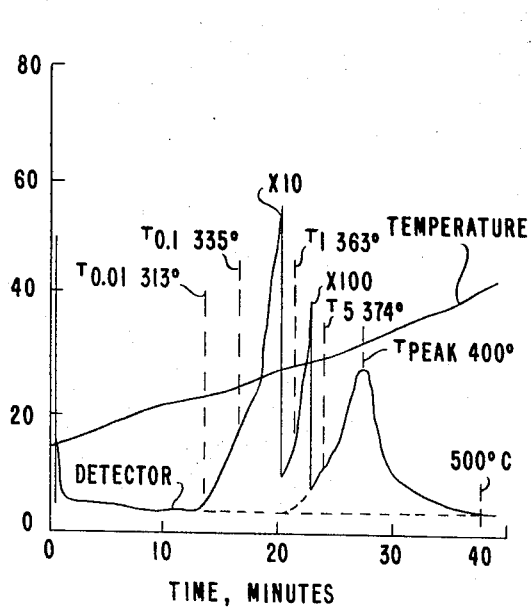
FIGS. 3 and 4 show thermal analysis curves for samples of a styrene polymer and an acrylonitrile/butadiene/styrene polymer, obtained using the apparatus of FIG. 1.

In FIG. 3 the thermal decomposition temperature of a polystyrene sample is indicated at rates of 0.01, 0.1, 1 and 5% per minutes of the total measured peak area (designated as $T_{0.01}$, $T_{0.1}$, $T_1$ and $T_5$, respectively). Good agreement with the results obtained by TGA are indicated by comparative data for several polymers shown in Table 1.

TABLE 1

[Thermal stabilities of several polymers [1]]

| Polymer | 10% volatilized | | 50% volatilized | | 1%/min. | |
|---|---|---|---|---|---|---|
| | TGA | MTA | TGA | MTA | TGA | MTA |
| Ethylene, commercial (Hi-Fax 1400-J) | 437 | 428 | 458 | 444 | 429 | 408 |
| Butadiene, experimental preparation | 423 | 405 | 448 | 444 | 422 | 373 |
| Propylene, experimental preparation | 405 | 395 | 436 | 405 | 395 | 376 |
| Styrene, experimental preparation | 380 | 378 | 397 | 393 | 378 | 360 |
| Isobutylene, commercial (Vistanex L-100) | 341 | 346 | 376 | 366 | 330 | 324 |

[1] TGA: sample weight, 50 mg.; heating rate, 2.5° C./min.; $N_2$ flow, 50 ml./min. MTA: sample weight, 0.2 mg.; heating rate, 6° C./min.; $N_2$ flow, 30 ml./min.
[2] The temperatures listed are averages for 2 or 3 tests.

Figure 4:
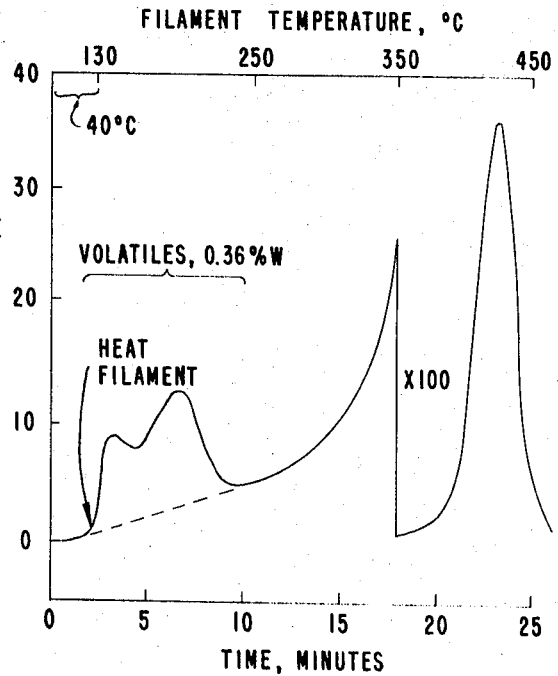

In another example, shown in FIG. 4, trace volatiles as well as thermal stability peaks were obtained of an acrylonitrile/butadiene/styrene polymer. To make this analysis, 1 mg. of polymer was placed in the pyrolysis chamber at 40° C. The filament coil temperature was raised rapidly to 130° and then programmed at 15° per minute to a final temperature of about 500°. When the heating cycle was started, the heater on the pyrolyzer unit was turned on to raise its temperature to about 170° to prevent adsorption or condensation of volatiles as they are liberated from the filament pyrolyzer. The amount of total volaties was estimated by applying the detector response factor for styrene to the peak area. Trace volatiles emerge at temperatures corersponding roughly to their boiling points, thus allowing some differentiation according to volatility. Volatiles can be observed down to a few thousandths of a percent in favorable cases.

Figure 2:
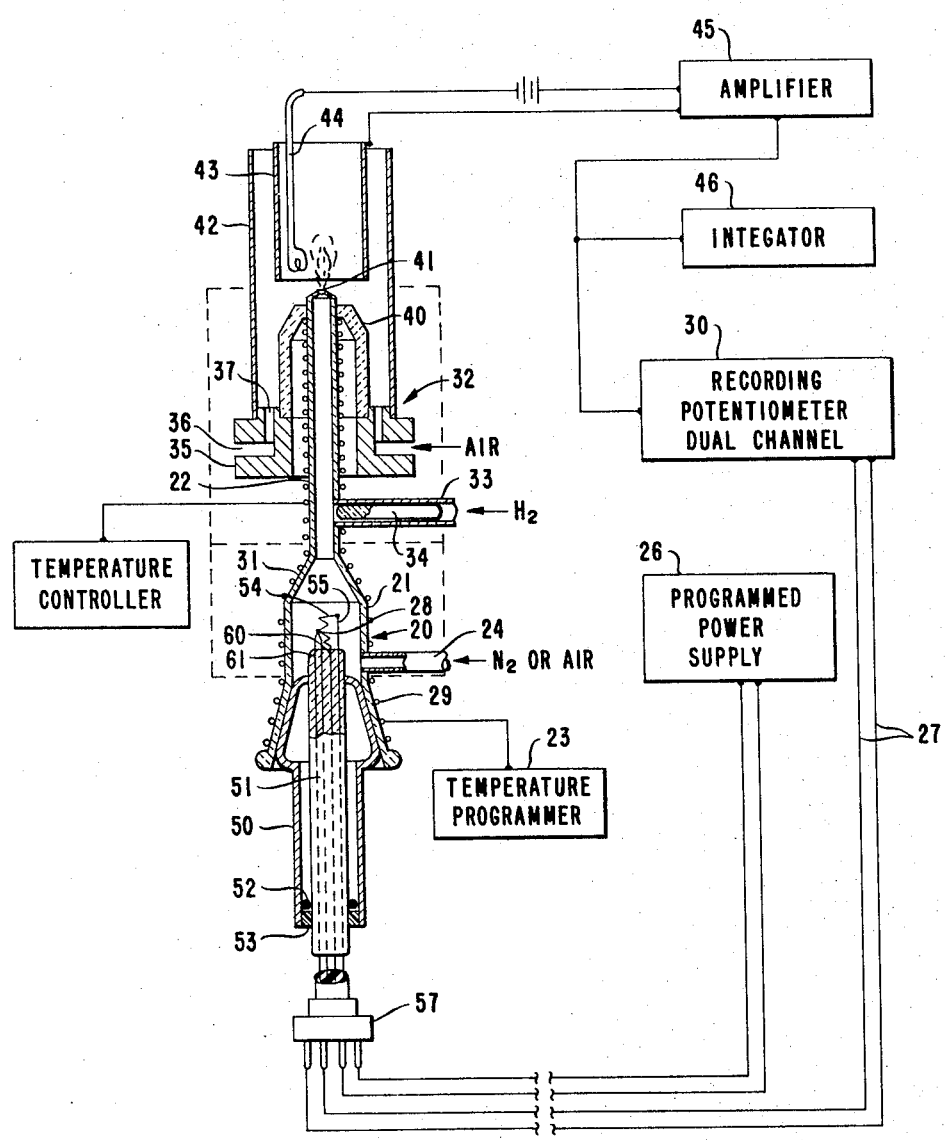
FIG. 2 shows the detailed construction of a second embodiment of the pyrolyzer-detector unit.

Referring now to FIG. 2 there is shown an improved version of the pyrolysis apparatus described above. In the improved version the heating or pyrolysis section is connected directly to the flame-ionization detector. The combination of close coupling and heating of the complete instrument substantially eliminates any possibility of the volatiles condensing when they pass from the pyrolyzer to the detector. The heating also eliminates the possibility of the condensibles fouling the detector since they remain in a gaseous state.

The tubular member 21 of the pyrolysis section 20 is provided with a necked-down or small-diameter portion 31 which connects with the jet 22 of the flame-ionization detector. An electrical-resistance heating element 29 is connected to a suitable device 23 for temperature programming or in the alternative the resistance heating element may be supplied from the program power supply 26 used for controlling the voltage supplied to the pyrolysis filament coil 54. The pyrolysis filament coil 54 is constructed as explained above for the apparatus of FIG. 1. The signals from thermocopule 28 are coupled to one channel of the dual-channel recorder 30 by leads 27 and 51. The filament coil is used as a sample heater only when it is desired to heat the sample very fast or to continue heating above about 500° C. mounting level of the pyrolysis filament coil. The inlet 24 is used to supply the carrier gas that sweeps the volatile products liberated in the filament coil to the flame-ionization detector. Conduit 33 connects with the pyrolyzer housing immediately below the flame-ionization detector and is utilized for supplying combustion gas to the flame-ionization detector. Normally, pure hydrogen is used as the combustion gas in the flame detector. A glass restriction rod 34 is placed in the conduit 33 to disperse the hydrogen in the nitrogen carrier gas and to prevent back diffusion of volatiles into the cooler hydrogen inlet and possible loss by condensation.

The flame-ionization detector is a modified commercial detector, e.g. the detector manufactured by the Aerograph Division of Varian Associates. The detector base is modified to permit sealing of the jet 22 directly to the pyrolysis section and heating of the jet 22 by means of a resistance wire wound on its outer surface. The power is supplied from an isolation transformer. The resistance wire heater is supplied with a bias voltage which for convenience is the same as the voltage on detector electrode 44. Without such a voltage the signal from the collector electrode 43 is partially lost when the detector is operated at high temperatures. The detector was also modified to permit air to circulate around the terminals of the electrodes to prevent damage to the insulation.

The modified detector consists of a circular-shaped metal base 35 having passageways 36 for admitting air to the flame-ionization detector. The air passageways 36 communicate with openings 37 provided in the top of the base 35. Thus, the air can flow upwardly around the center portion of the flame-ionization detector and mix with the hydrogen and burn at the tip 41 of the flame-ionization detector jet 22. A cone 40 is placed around the tip 41 of the flame-ionization detector to prevent contamination from influx of room air. It is preferably formed of ceramic, quartz or other insulating material. The flame-ionization detector is provided with an outer housing 42 and electrodes 43 and 44. Electrode 44 is placed adjacent to the flame. Electrode 44 also serves as the ignition coil by which the gas flowing from the tip 41 may be ignited. The flame detector is connected to an amplifier 45 and then to the dual-channel recording potentiometer 30. It is desirable to couple an integrating circuit 45 to the flame-ionization detector to supply an integrated output of the detector signal.

The pyrolysis element is provided with an outer tubular housing or support member 50, normally formed of glass or Vycor and having a tapered joint. Fitting into the housing 50 is a glass support member 51 for the pyrolysis filament coil 54 or other suitable sample holder. The glass support member 51 is removably sealed in the housing 50 by means of an O-ring and a wax sealing plug 53. Sealing plug 53 may be formed of sealing wax or similar material that is capable of forming a gas tight seal between the glass support element and the outer housing. The pyrolysis filament coil 54 is mounted at the top of the glass support element 51. As explained above with respect to FIG. 1, the pyrolysis filament coil may be formed of platinum wire that is wound in a cone-shaped coil. The two leads 60 from the filament coil 54 are sealed in the glass support member 51 and terminate at the terminals of a connecting plug 57 at the bottom of the pyrolysis element. The leads 61 from the thermocouple 28 which is attached to the bottom of the pyrolysis coil are also sealed in the glass support element and connected to terminals on the connector 57.

The materials of construction of the pyrolyzer-flame detector unit (Vycor, quartz, and glass) are chosen to allow cleaning of the system between tests by switching from nitrogen carrier gas to air with the system at high temperature, normally at 500 to 600° C.

A mixing chamber may be attached to the inlet 24 to permit the introduction of known amounts of gaseous hydrocarbons for calibration purposes. The use of a mixing chamber spreads the peak obtained with the hydrocarbon, e.g. butane or methane, and avoids overloading the detector.

In lieu of the filament-thermocouple sample probe described above, simpler types of probes have been used effectively, e.g. a metal or glass cup supported in the pyrolyzer tube on or near a suitable thermocouple.

Use of the instrument in the thermal analysis of polyolefins is shown in FIGS. 5 and 6. In the thermal analysis of polyolefins no significant condensation occurred when the detector was operated at 500° C. In one such example, 0.5 mg. of a polyethylene was heated (by means of the external heater around the pyrolyzer furnace) at 10° per minute to 520° C. to obtain the thermogram shown in FIG. 5. From the total peak area obtained, the yield of hydrocarbon was computed to be 98% of the sample weight. For this measurement the peak area per mg. of carbon was calibrated using n-butane as the standard. The yields at lower detector temperatures were:

400°, 90%; 260°, 80%; 180°, 78%

Good recovery of compounds of low volatility was demonstrated also with squalane by vaporizing 0.603 mg. of this compound ($C_{30}H_{62}$) in the apparatus of FIG. 2 at 200° C. The recovery, based on calibrations with butane, was 97%. In this test the flame detector temperature was 500° C.

A further application of the instrument is illustrated by the thermogram in FIG. 6 for an oil shale. This type of analysis is made by heating about 5 mg. of the finely ground material at 10° per minute to 500° C. The thermogram permits a rapid determination of hydrocarbon yield as a function of the time-temperature heating schedule. The total yield of hydrocarbon correlates well with the oil yields obtained by the well-known 500° C. Fischer assay method as shown by the data given in Table 2, but has several advantages.

TABLE 2
[Analysis of oil shales]

|  | Sample | | |
| --- | --- | --- | --- |
|  | A | B | C |
| Fischer Assay (500° C.), percent w. oil | 7.4 | 11.4 | 15.8 |
| MTA, percent w. hydrocarbon | 7.4 | 13.5 | 17.0 |
| MTA, percent w. of total hydrocarbon: | | | |
| At 200° C | 1.8 | 1.3 | 2.5 |
| 300° C | 4.1 | 4.0 | 4.6 |
| 400° C | 12.7 | 14.0 | 9.8 |
| 500° C | 100. | 100. | 100. |

As indicated in the thermogram of FIG. 6 the analysis differentiates the relatively low-boiling components in the shale from the hydrocarbons generated by thermal decomposition. Further, the decomposition rates can be determined at any particular temperature (as percentages of the total area per unit time). The new thermal analyzer is faster, requires less sample and there is no loss of light hydrocarbons as in the Fischer assay.

Application of the instrument for the analysis of volatiles in a bitumen sample is illustrated in FIG. 7. The use of a stepwise heating technique is also exemplified. Advantageous over the gravimetric ASTM methods for volatiles in bitumens (methods D-6 and D-1954) are high sensitivity—at least down to 0.001% with a 5-10 mg. sample—and the more rapid and complete stripping of volatiles because of the small sample employed.

Another application of the instrument is the determination of the vapor pressure of organic compounds at a low level. By designing the sample probe and carrier gas inlet so that the gas passes through the sample and becomes saturated with sample vapor, the vapor pressure can be measured at various temperatures. Utility of the equipment for this purpose has been demonstrated by passing carrier gas saturated with cetane through the system.

The vapor pressure at 25° C. was measured as 1.4 microns, which is in good agreement with the literature value of 1.5 microns. This vapor pressure in the nitrogen carrier gas (at 30 cc. per min. corresponds with a flow rate of 0.5 $\mu$g. of cetane per min. The estimated limit of detection is about 0.01 $\mu$g. per min., equivalent to 0.03 micron of cetane.

The instrument may be modified by using different detectors to improve the sensitivity for certain compounds. For example, an electron capture detector would give specifically the evolution-temperature pattern of halides, nitriles and nitrates, since this detector is relatively insensitive to other compounds. Similarly, a thermionic detector would give a specific pattern for phosphorus compounds.

I claim:

1. A method for conducting a thermal analysis of the organic material in a sample to obtain quantitative yield versus temperature information of the organic materials, said method comprising:

placing a quantity of the sample in a container and placing the container in a heater section;

close coupling the heater section directly to a detector specific for organic material to substantially eliminate condensation of evolved material when passing from the heater section to the detector;

heating both the heater section and the container holding the sample;

measuring the temperature of the sample during said heating;

maintaining the detector at a temperature above 300° C.; and recording both the output of said detector and the temperature of the sample in a correlatable manner.

2. An apparatus for conducting a thermal analysis of the organic material in a sample to obtain the thermal stability and/or quantitative yield versus temperature information of organic materials, said apparatus comprising:

a sample holder;

a temperature-sensing means, said temperature-sensing means being attached to said sample holder;

a heater housing, said heater housing having a heating means associated with it, said sample holder being mounted within said heater housing;

a detector specific for organic material including means for heating said detector at least to 300° C., said detector being connected to said heater to form a unitary structure with the detector element to substantially eliminate condensation of evolved matter when passing from said heater housing to said detector; and recorder means, said temperature-sensing means and said detector being coupled to said recorder means.

3. The apparatus of claim 2 wherein the detector is a flame-ionization detector.

4. The apparatus of claim 2 and in addition a control means for controlling the electrical power supplied to said heating means to cause it to increase in temperature at a predetermined rate.

5. The apparatus of claim 2 wherein said detector is maintained at a temperature of 300 to 600 degrees centigrade.

6. The method of claim 1 wherein the heating is done at a controlled rate to provide a predetermined heating schedule.

7. The apparatus of claim 3 wherein a resistance heating means surrounds the jet of said flame-ionization detector, said resistance heating means being supplied with a bias voltage opposite in polarity to that of the collector electrode of the detector.

8. The method of claim 1 wherein both the pyrolyzer heater section and sample holder are heated to temperatures up to 600 degrees centigrade and then only the sample holder is heated to about 900 degrees centigrade.

9. The apparatus of claim 2 wherein said heater housing and detector are formed from temperature resistant glass and being fused together to form said unitary structure.

References Cited

UNITED STATES PATENTS

| | | | |
|---|---|---|---|
| 2,669,504 | 2/1954 | Halvorson et al. | 23—230PC |
| 2,795,132 | 6/1957 | Boehme et al. | 73—19 |
| 2,947,163 | 8/1960 | Stone | 23—230PC |
| 3,045,472 | 7/1962 | Paulik et al. | 23—230X |
| 3,065,060 | 11/1962 | Roehrig et al. | 23—253PC |
| 3,084,534 | 4/1963 | Goton | 23—230X |
| 3,215,499 | 11/1965 | Dewar et al. | 23—232E |
| 3,414,382 | 12/1968 | Kapff et al. | 23—230 |
| 3,407,041 | 10/1968 | Kraus | 23—230PC |

OTHER REFERENCES

Ayres et al., "Differential Thermal Studies With Simultaneous Gas Evolution Profiles," Analytical Chemistry, vol. 33, No. 4, April 1961, pp. 568–572.

Rogers et al., "Pyrolysis as an Analytical Tool," Analytical Chemistry, vol. 32, No. 6, May 1960, pp. 672, 675, 677, 678.

MORRIS O. WOLK, Primary Examiner

R. E. SERWIN, Assistant Examiner

U.S. Cl. X.R.

23—232, 253, 254; 73—15